(12) United States Patent
Cao et al.

(10) Patent No.: US 12,620,141 B2
(45) Date of Patent: May 5, 2026

(54) IMAGE STYLE CONVERSION METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Yun Cao, Shenzhen (CN); Xinyi Zhang, Shenzhen (CN); Junwei Zhu, Shenzhen (CN); Ying Tai, Shenzhen (CN); Mu Zhang, Shenzhen (CN); Chengjie Wang, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 112 days.

(21) Appl. No.: 18/128,081

(22) Filed: Mar. 29, 2023

(65) Prior Publication Data

US 2023/0245351 A1 Aug. 3, 2023

Related U.S. Application Data

(63) Continuation of application No. PCT/CN2022/099989, filed on Jun. 21, 2022.

(30) Foreign Application Priority Data

Jul. 23, 2021 (CN) .......................... 202110839235.X

(51) Int. Cl.
*G06T 5/50* (2006.01)
*G06T 11/00* (2006.01)

(52) U.S. Cl.
CPC ................ *G06T 11/00* (2013.01); *G06T 5/50* (2013.01); *G06T 2207/20081* (2013.01); *G06T 2207/20221* (2013.01); *G06T 2207/30201* (2013.01)

(58) Field of Classification Search
CPC . G06T 2207/20081; G06T 2207/20221; G06T 5/50
See application file for complete search history.

(56) References Cited

U.S. PATENT DOCUMENTS

| | | | | |
|---|---|---|---|---|
| 10,713,754 | B1 * | 7/2020 | Wang | G06N 3/04 |
| 10,762,398 | B2 * | 9/2020 | Sjölund | G06V 10/454 |

(Continued)

FOREIGN PATENT DOCUMENTS

| | | |
|---|---|---|
| CN | 108846793 A | 11/2018 |
| CN | 111223039 A | 6/2020 |

(Continued)

OTHER PUBLICATIONS

Tencent Technology, WO, PCT/CN2022/099989, Sep. 6, 2022, 5 pgs.

(Continued)

*Primary Examiner* — Yi Yang
(74) *Attorney, Agent, or Firm* — Morgan, Lewis & Bockius LLP

(57) ABSTRACT

Embodiments of this application disclose an image style conversion method performed by an electronic device. The method includes: performing quality enhancement on a first target style image to obtain a second target style image; performing feature extraction on the second target style image to obtain a target style feature; performing migration training on a preset target style conversion model by using a full style conversion model and the target style feature to obtain a target style conversion model; inputting a full style feature, the target style feature, and a to-be-converted image into the target style conversion model, and performing style conversion on the to-be-converted image using the target style conversion model to obtain a target image conforming to a target style.

17 Claims, 8 Drawing Sheets

(56) References Cited

U.S. PATENT DOCUMENTS

| | | | | |
|---|---|---|---|---|
| 11,276,207 | B2 * | 3/2022 | Li | G06T 11/001 |
| 11,526,712 | B2 * | 12/2022 | Chen | G06V 40/169 |
| 2019/0188882 | A1 * | 6/2019 | Son | G06N 3/047 |
| 2019/0228264 | A1 * | 7/2019 | Huang | G06V 10/993 |
| 2021/0142064 | A1 * | 5/2021 | Shimizu | G06V 10/764 |
| 2021/0166028 | A1 * | 6/2021 | Ramenahalli Govindaraju | |
| | | | | G06V 20/52 |

FOREIGN PATENT DOCUMENTS

| | | | |
|---|---|---|---|
| CN | 112232425 | A | 1/2021 |
| CN | 113012073 | A | 6/2021 |
| CN | 113822794 | A | 12/2021 |

OTHER PUBLICATIONS

Tencent Technology, IPRP, PCT/CN2022/099989, Jan. 18, 2024, 6 pgs.
Tencent Technology, ISR, PCT/CN2022/099989, Sep. 6, 2022, 2 pgs.

* cited by examiner

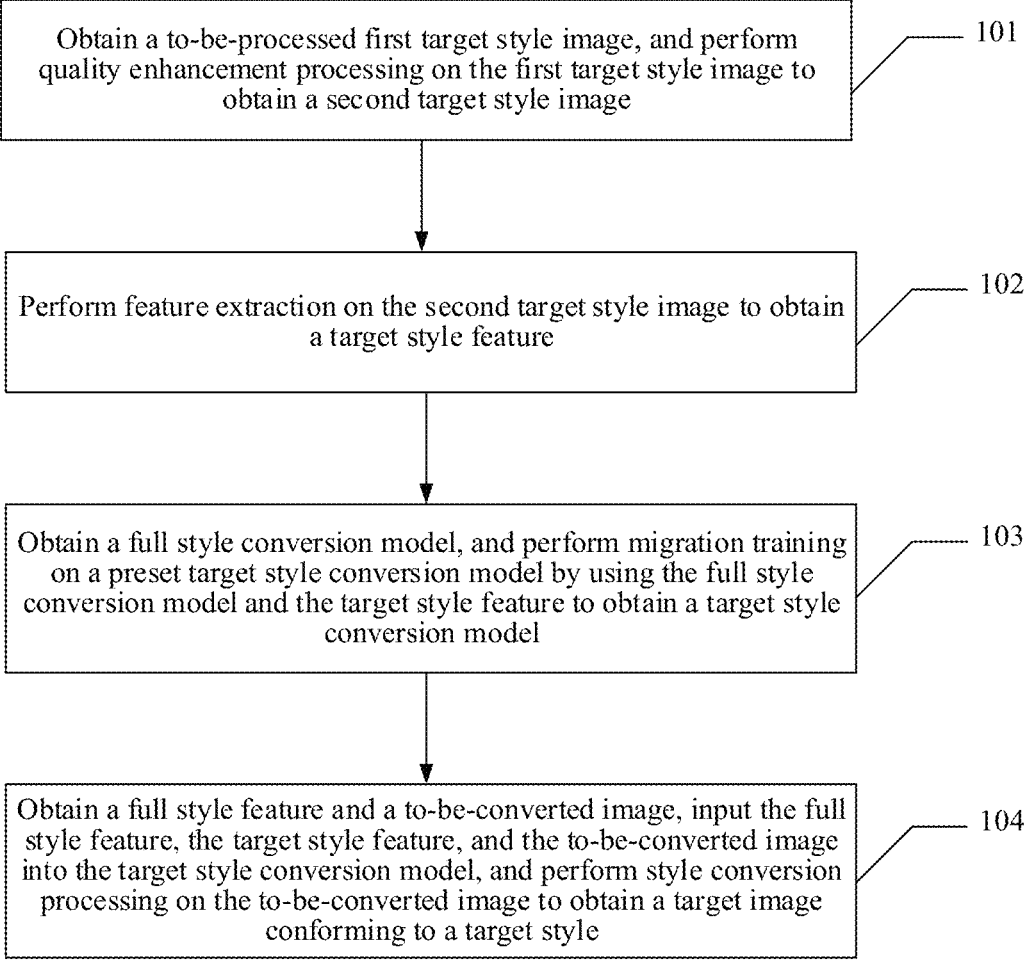

Obtain a to-be-processed first target style image, and perform quality enhancement processing on the first target style image to obtain a second target style image ⎯⎯ 101

Perform feature extraction on the second target style image to obtain a target style feature ⎯⎯ 102

Obtain a full style conversion model, and perform migration training on a preset target style conversion model by using the full style conversion model and the target style feature to obtain a target style conversion model ⎯⎯ 103

Obtain a full style feature and a to-be-converted image, input the full style feature, the target style feature, and the to-be-converted image into the target style conversion model, and perform style conversion processing on the to-be-converted image to obtain a target image conforming to a target style ⎯⎯ 104

Image enhancement model 602

007

008

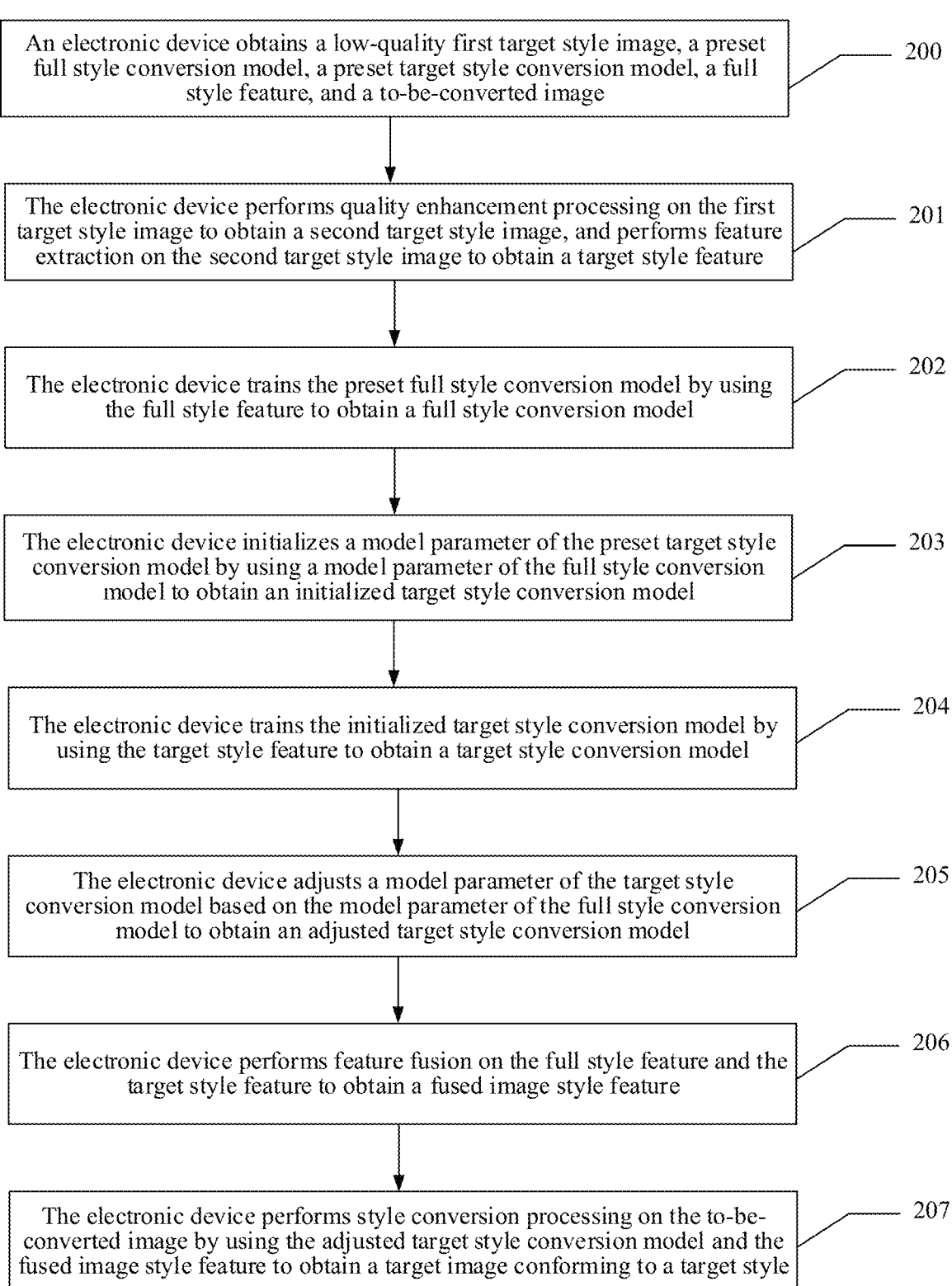

An electronic device obtains a low-quality first target style image, a preset full style conversion model, a preset target style conversion model, a full style feature, and a to-be-converted image — 200

The electronic device performs quality enhancement processing on the first target style image to obtain a second target style image, and performs feature extraction on the second target style image to obtain a target style feature — 201

The electronic device trains the preset full style conversion model by using the full style feature to obtain a full style conversion model — 202

The electronic device initializes a model parameter of the preset target style conversion model by using a model parameter of the full style conversion model to obtain an initialized target style conversion model — 203

The electronic device trains the initialized target style conversion model by using the target style feature to obtain a target style conversion model — 204

The electronic device adjusts a model parameter of the target style conversion model based on the model parameter of the full style conversion model to obtain an adjusted target style conversion model — 205

The electronic device performs feature fusion on the full style feature and the target style feature to obtain a fused image style feature — 206

The electronic device performs style conversion processing on the to-be-converted image by using the adjusted target style conversion model and the fused image style feature to obtain a target image conforming to a target style — 207

IMAGE STYLE CONVERSION METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2022/099989, entitled "IMAGE STYLE CONVERSION METHOD AND APPA-RATUS, ELECTRONIC DEVICE, AND STORAGE MEDIUM" filed on Jun. 21, 2022, which claims priority to Chinese Patent Application No. 202110839235.X, entitled "IMAGE STYLE CONVERSION METHOD AND APPA-RATUS, ELECTRONIC DEVICE, AND STORAGE MEDIUM" and filed with the China National Intellectual Property Administration on Jul. 23, 2021, the entire contents of which are incorporated herein by reference.

FIELD OF THE TECHNOLOGY

This application relates to the field of computer technologies, and in particular, to an image style conversion method and apparatus, an electronic device, and a storage medium.

BACKGROUND OF THE DISCLOSURE

With the rapid development of communication and computer technologies, an image processing technology based on computers and communication has also been developed robustly and rapidly and applied to various fields. For example, the image processing technology may be used to convert an image style to obtain an image of a different style. In the process of research and practice of the related art, the inventors of this application found that in the related art, during image style conversion, accuracy of training an image style conversion model is reduced due to large costs of obtaining high-quality training samples.

SUMMARY

Embodiments of this application provide an image style conversion method and apparatus, an electronic device, and a storage medium, which improve accuracy of training an image style conversion model by using limited and low-quality samples.

According to one aspect, an embodiment of this application provides an image style conversion method, performed by an electronic device, and including:

performing quality enhancement on a first target style image to obtain a second target style image;

performing feature extraction on the second target style image to obtain a target style feature;

performing migration training on a preset target style conversion model by using a full style conversion model and the target style feature to obtain a target style conversion model; and inputting a full style feature, the target style feature, and a to-be-converted image into the target style conversion model, and performing style conversion on the to-be-converted image using the target style conversion model to obtain a target image conforming to a target style.

According to another aspect, an embodiment of this application further provides an image style conversion apparatus, including:

an obtaining unit, configured to perform quality enhancement on a first target style image to obtain a second target style image;

a feature extraction unit, configured to perform feature extraction on the second target style image to obtain a target style feature;

a migration training unit, configured to perform migration training on a preset target style conversion model by using a full style conversion model and the target style feature to obtain a target style conversion model; and a style conversion unit, configured to input a full style feature, the target style feature, and a to-be-converted image into the target style conversion model, and performing style conversion on the to-be-converted image using the target style conversion model to obtain a target image conforming to a target style.

According to another aspect, an embodiment of this application further provides a computer program product or a computer program, the computer program product or the computer program including computer instructions, and the computer instructions being stored in a computer-readable storage medium.

According to another aspect, an embodiment of this application further provides an electronic device, including a memory and a processor, the memory storing a plurality of instructions that, when executed by the processor, cause the electronic device to perform the image style conversion method described above.

According to another aspect, an embodiment of this application further provides a non-transitory computer-readable storage medium, the storage medium storing instructions that, when executed by a processor of an electronic device, cause the electronic device to perform the image style conversion method described above.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

FIG. 2 is a schematic flowchart of an image style conversion method according to an embodiment of this application.

FIG. 8 is another schematic flowchart of an image style conversion method according to an embodiment of this application.

DESCRIPTION OF EMBODIMENTS

The technical solutions in embodiments of this application are described below clearly and completely with reference to the drawings in the embodiments of this application. However, the described embodiments are merely some rather than all of the embodiments of this application. All other embodiments obtained by a person skilled in the art based on the embodiments of this application without creative efforts shall fall within the protection scope of this application.

An embodiment of this application provides an image style conversion method. The image style conversion method may be performed by an image style conversion apparatus. The image style conversion apparatus may be integrated into an electronic device. The electronic device may include a terminal and a server, and the like.

The terminal may be a smartphone, a tablet computer, a notebook computer, a personal computer (PC), smart home, a wearable electronic device, a VR/AR device, an in-vehicle computer, or the like. The server may be an interoperable server or a backend server between a plurality of heterogeneous systems, or may be an independent physical server, or may be a server cluster or a distributed system including a plurality of physical servers, or may be a cloud server providing basic cloud computing services, such as a cloud service, a cloud database, cloud computing, a cloud function, cloud storage, a network service, cloud communication, a middleware service, a domain name service, a security service, and a big data and artificial intelligence platform, or the like.

According to this embodiment of this application, each image has an original style, which is converted into another target style through an image style conversion apparatus. For example, portrait animation is to convert a real photograph of a person into an animation image of a specified style.

During conversion of a style of an image, a conversion model used usually needs a large amount of uniform data for training, so that a high-quality result can be obtained. For example, for animation, a large amount of animation pictures of a uniform style are needed as training pictures. However, these training pictures usually need to be drawn manually and cannot be captured by a real person, resulting in very high costs for obtaining training pictures.

To this end, in the method described in this embodiment of this application, a high-quality target style conversion model can be generated based on unsupervised learning by using only a limited quantity of low-quality image samples. This resolves a current problem of difficulty in obtaining a large quantity of high-quality specified-style training pictures for animation generation tasks.

Figure 1:
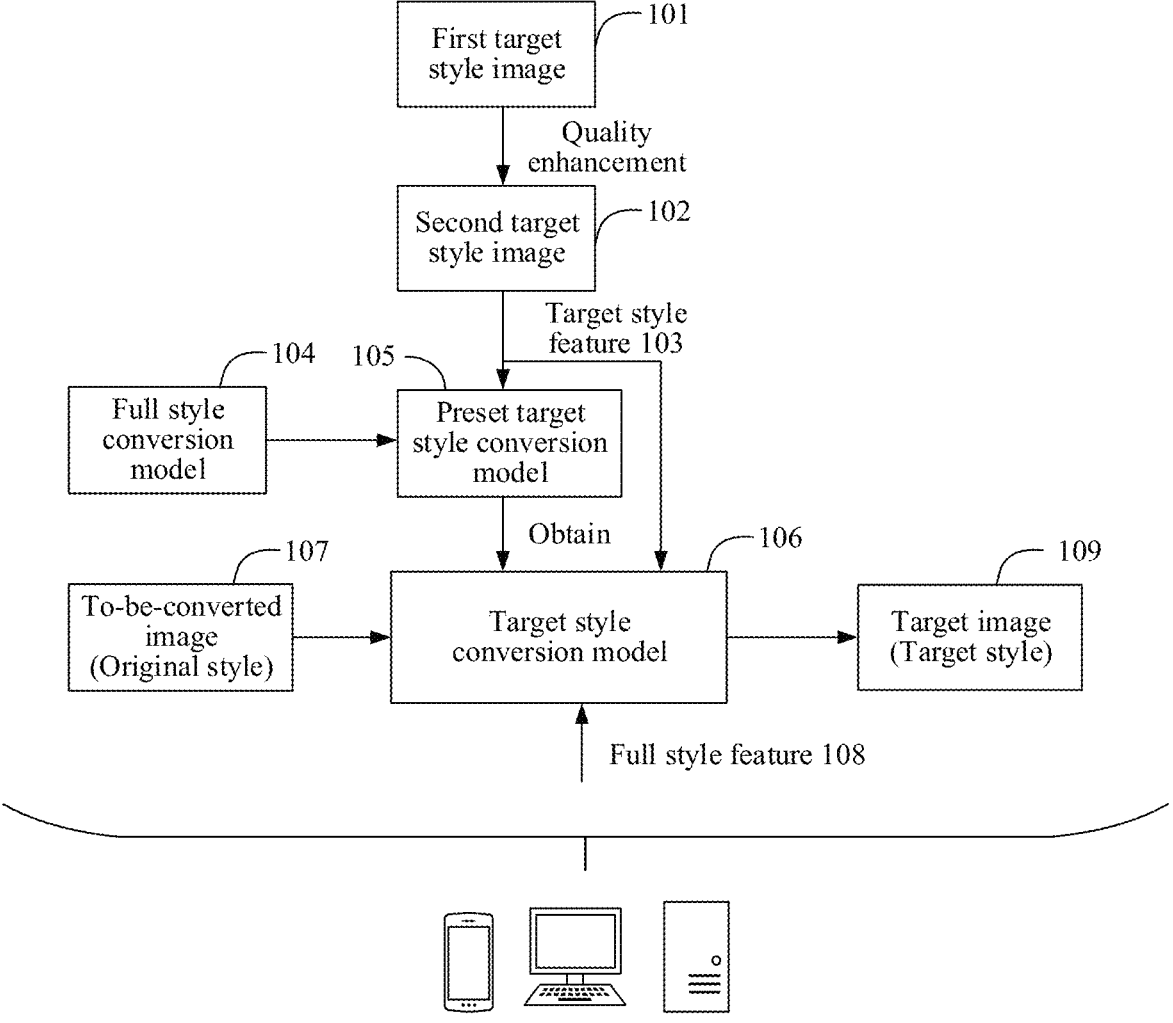
FIG. 1 is a schematic scenario diagram of an image style conversion method according to an embodiment of this application.

In an embodiment, as shown in FIG. 1, the image style conversion apparatus may be integrated into an electronic device 110, such as a terminal or a server, to implement the image style conversion method provided in this embodiment of this application.

Specifically, the electronic device 110 may pre-obtain a low-quality first target style image 101, perform quality enhancement on the first target style image 101 to obtain a second target style image 102, and extract a target style feature 103 from the second target style image 102; obtain a full style conversion model 104, where the full style conversion model 104 can convert an original style of an image into a plurality of basic image styles; and perform migration training on a preset target style conversion model 105 by using the full style conversion model 104 and the target style feature 103 to obtain a target style conversion model 106, where the target style conversion model 106 is used for converting the original style of the image into a target style.

A to-be-converted image 107 may be processed after the target style conversion model 106 is obtained. Specifically, a full style feature 108 is obtained, the full style feature 108, the target style feature 103, and the to-be-converted image 107 are inputted into the target style conversion model 106, and style conversion processing is performed on the to-be-converted image 107 to obtain a target image 109 conforming to the target style.

It can be learned that, from the perspective of training samples, in the method described in this embodiment of this application, only a limited quantity of low-quality image samples are needed, that is, the first target style image 101 is used for obtaining the target style feature. Herein, "a limited quantity" refers to approximately 500-2000. An extremely small quantity leads to poor image quality after model conversion. "Low quality" includes two parameters: noise and low resolution. Therefore, costs of preparation for training data can be greatly reduced, thereby improving efficiency of training an image style conversion model.

FIG. 2 is a schematic flowchart of an image style conversion method according to an embodiment of this application. The method may be performed by an electronic device. The electronic device may be a server, or may be a device such as a terminal, for example, the electronic device 110 in FIG. 1. As shown in FIG. 2, an image style conversion method is provided. A specific procedure includes the following steps:

101. Obtain a first target style image, and perform quality enhancement on the first target style image to obtain a second target style image.

The first target style image refers to a target style image whose image quality needs to be enhanced. For example, the first target style image may be an image with relatively low resolution. For another example, the first target style image may be an image with much noise, or the like.

Quality enhancement processing may be performed on the first target style image in a plurality of manners. In an embodiment, an image enhancement model is obtained; and quality enhancement processing is performed on the first target style image by using the image enhancement model. The image enhancement model may be a model with Conv-BN-ReLU stacked as a network structure. The image enhancement model can convert an image with relatively low quality into an image with high quality. For example, an image with low resolution is converted into an image with high resolution, and noise in the image is canceled. After such enhancement, the second target style image becomes an optimized target style image.

102. Perform feature extraction on the second target style image to obtain a target style feature.

In an embodiment, after the second target style image is obtained, feature extraction may be performed on the second target style image to obtain a target style feature. The target style feature refers to information that can best reflect an image style.

In an embodiment, feature extraction may be performed on the second target style image in a plurality of manners to obtain the target style feature.

For example, feature extraction may be performed on the second target style image by using various network models based on machine learning to obtain the target style feature.

For another example, a color channel value on each color channel of the second target style image may be extracted, and then an operation is performed on the color channel value on the each color channel to obtain the target style feature. For example, a convolution operation may be performed on the color channel value on the each color channel, and then weighted summation is performed to obtain the target style feature.

The color channel may be a storage space for storing color components of an image. For example, a red (R) channel may be a channel that stores a red channel value; a green (G) channel may be a channel that stores a green channel value; and a blue (B) channel may be a channel that stores a blue channel value. Each type of color channel may be a storage space of 8 bits, each bit storing a corresponding color channel value.

For example, when the second target style image belongs to a red, green, blue (RGB) color mode, the second target style image includes three color channels: red, green, and blue channels. A convolution operation may be performed on the color channel values corresponding to the three color channels to obtain color feature information corresponding to each color channel. Next, weighted summation may be performed on the color feature information corresponding to the each color channel to obtain the target style feature of the second target style image.

103. Obtain a full style conversion model, and perform migration training on a preset target style conversion model by using the full style conversion model and the target style feature to obtain a target style conversion model.

Images in this embodiment of this application may be of various types, for example, photographs, paintings, comics, watercolors, maps, or film and television images. An image style refers to a representative look of an image that includes the look of the image as a whole. For example, images created by each person generally have personal features. Therefore, the images created by the each person generally develop a personal style.

For example, paintings of each person generally have a personal style of painting. In this case, the style of painting represents an unique style of the creator. For example, paintings of Van Gogh have a distinctive "Van Gogh style"; paintings of Picasso have a distinctive "Picasso style"; paintings of Xu Beihong have a distinctive "Xu Beihong style"; paintings of Miyazaki have a distinctive "Miyazaki style", and so on.

For another example, photographic works of each person generally have personal features. Therefore, the photographic works of the each person can develop a distinctive and unique style of the person.

For another example, an image may be classified into a plurality of image styles, such as an abstract style or a realistic style, according to composition content of the image.

For another example, a painting may be classified into a plurality of styles, such as an oil painting style, a comic style, a watercolor style, or an ink painting style, according to a material used for creating the painting.

Figure 3:
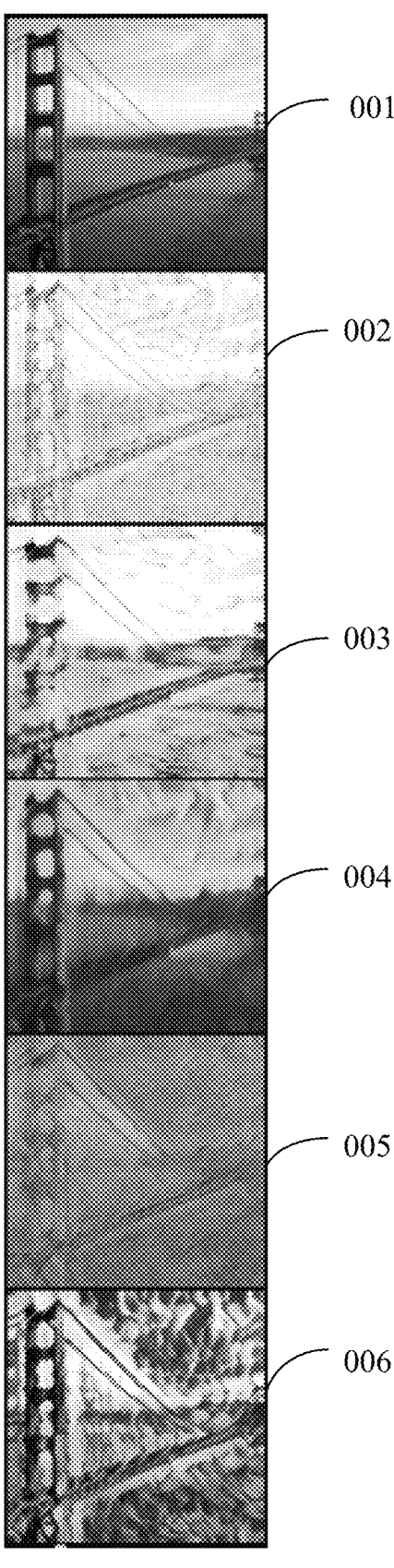
FIG. 3 is a schematic scenario diagram of an image style according to an embodiment of this application.

For example, as shown in FIG. 3, for the same original photograph, an image 001, an image 002, an image 003, an image 004, an image 005, and an image 006 represent different styles of images.

In this embodiment of this application, the full style conversion model includes a model that can convert an original style of an image into a plurality of basic styles. The plurality of basic styles may include the image styles listed above, and represent a necessary set of image styles. For example, there are 10 image styles, and the 10 image styles are different from one another. For ease of representation of the 10 image styles, the 10 image styles may be collectively referred to as basic styles.

In an embodiment, the target style refers to a style that a user wants an image to show. For example, an original style of a to-be-converted image is a realistic style, but if the user wants to convert the to-be-converted image into an abstract style, the abstract style may be the target style.

In an embodiment, the full style conversion model may be a model framed by a machine learning network.

For example, the machine learning network includes a convolutional neural network (CNN), a de-convolutional network (DN), a deep neural network (DNN), a deep convolutional inverse graphics network (DCIGN), a generative adversarial network (GAN), a region-based convolutional network (RCNN), a faster region-based convolutional network (Faster RCNN), a Bidirectional Encoder Representations from Transformers (BERT) model, or the like. The full style conversion model may be a model framed by any one of machine learning networks such as the CNN, DNN, and GAN.

In a machine learning method, transfer learning is one of the learning methods, which refers to using a model developed for a task A as an initial point, and reusing the model in a process of developing a model for a task B. In this case, in step 103, the performing migration training on a preset target style conversion model by using the full style conversion model and the target style feature refers to using the full style conversion model as an initial point and reusing it in a model developed for the target style, that is, the target style conversion model.

In an embodiment, the target style conversion model may alternatively be a model framed based on the machine learning network, for example, a model framed by any one of the machine learning networks such as the CNN, DNN, and GAN.

In an embodiment, the full style conversion model is obtained in the following manner: training a preset full style conversion model, so that parameters in the trained full style conversion model can represent a law of each basic style conversion, and then performing style conversion on an image based on the law of the each basic style conversion.

The preset full style conversion model includes a preset and untrained model, for example, a GAN with only a network architecture, where the GAN cannot implement a function of converting an image into a basic style.

Figure 4:
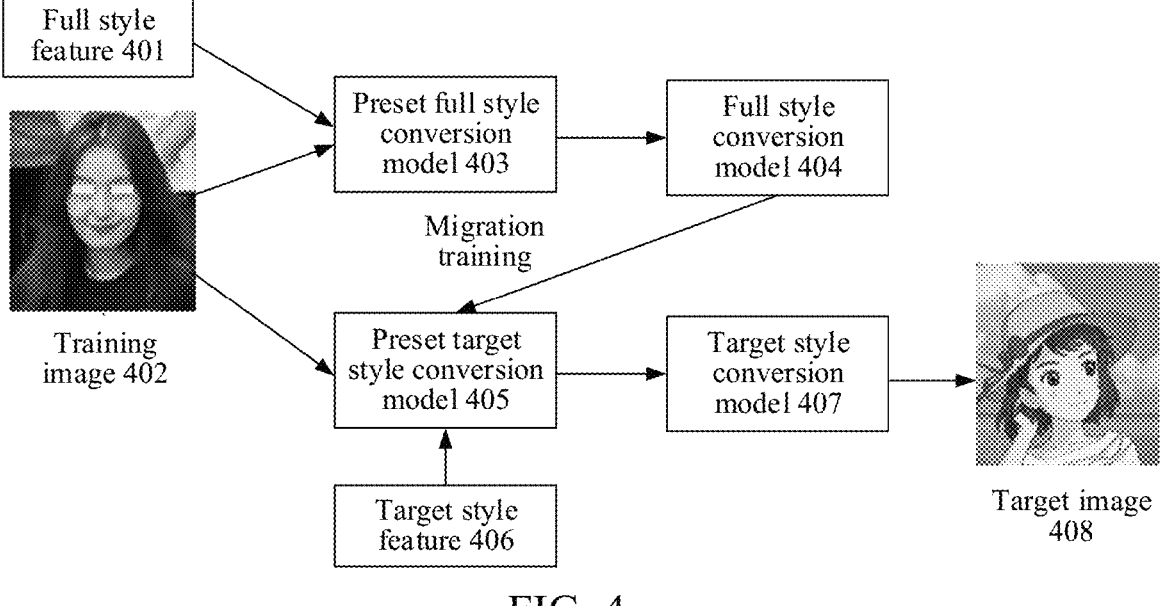
FIG. 4 is a schematic scenario diagram of migration training according to an embodiment of this application.

As shown in FIG. 4, before a full style conversion model 404 is obtained, a preset full style conversion model 403 may be trained by using a full style feature 401 and a training image 402, to obtain the full style conversion model 404.

A function of the target style conversion model is similar to that of the full style conversion model, and both are intended to implement image style conversion, but the target style conversion model may be aimed at some specific styles. Therefore, migration training may be performed on the preset target style conversion model by using the full style conversion model and the target style feature, thereby improving efficiency of training a target style conversion model.

In addition, in an embodiment, according to a model training process, the model framed based on the machine learning network may be divided into a model based on supervised learning and a model based on unsupervised learning.

The supervised learning refers to a process of adjusting parameters in a model by using a group of samples of a known class (that is, labeled training data), so that the model achieves required performance. The training data includes a set of training examples. In the supervised learning, each instance includes an input object (usually a vector) and an expected output value (also referred to as a supervised signal). A supervised learning algorithm is analyzing the training data and producing an inference function, and may be used for mapping out a new instance.

However, due to lack of sufficient prior knowledge, it is difficult to manually label classes, or costs of manual class labeling is extremely high. In this case, it is hoped that the model can reduce the demand for labeled training data, but train the model according to training samples with unknown classes (that is, not labeled). This process is referred to as unsupervised learning.

In an embodiment, it may be determined according to a model frame, training data, and the like of the preset target style conversion model, whether a supervised learning manner or an unsupervised learning manner is used to train the target style conversion model.

For example, when the model frame of the preset target style conversion model is a CNN and the training data has label information, the supervised learning manner may be used to train the model frame CNN of the preset target style conversion model.

For another example, when the model frame of the preset target style conversion model is a GAN but the amount of the training data is sufficient, the unsupervised learning manner may be used to train the model frame GAN of the preset target style conversion model.

However, due to a usually small quantity of target style images used as training data, if the target style images are directly used to train the preset target style conversion model, an effect of the target style conversion model is relatively poor. Therefore, as shown in FIG. 4, the full style conversion model 404 with relatively good performance may be used and the training image 402 and a target style feature 406 are inputted, to perform migration training on a preset target style conversion model 405 to obtain a target style conversion model 407. An obtained target style is shown by a target image 408.

Specifically, the step of "performing migration training on a preset target style conversion model by using the full style conversion model and the target style feature to obtain a target style conversion model" may include:

initializing a model parameter of the preset target style conversion model by using a model parameter of the full style conversion model to obtain an initialized target style conversion model; and training the initialized target style conversion model by using the target style feature to obtain the target style conversion model.

The preset target style conversion model includes a preset and untrained model, for example, a GAN with only a network architecture, where the GAN does not have any function and cannot convert an image of an original style into an image of a target style.

In an embodiment, to enable the full style conversion model to perform migration training on the preset target style conversion model, a model architecture of the full style conversion model is usually the same as a model architecture of the preset target style conversion model.

For example, if the model architecture of the full style conversion model includes three function layers, the model architecture of the preset target style conversion model also includes three function layers.

In an embodiment, when a model parameter of the preset target style conversion model is initialized by using a model parameter of the full style conversion model, the model parameter of the preset target style conversion model may be set according to the model parameter of the full style conversion model, so that an initialized target style conversion model has a basic capability of image style conversion.

For example, if parameters of the three function layers in the full style conversion model are respectively k1, k2, and k3, parameters of the three function layers in the preset target style conversion model may also be k1, k2, and k3.

In an embodiment, to enable the target style conversion model to convert an original style of an image into the target style, the initialized target style conversion model may be trained by using the target style feature to obtain the target style conversion model.

Specifically, the step of "training the initialized target style conversion model by using the target style feature to obtain the target style conversion model" may include:

obtaining a training image;

performing style conversion on the training image by using the target style feature and the initialized target style conversion model to obtain a style-converted image;

calculating loss information between the style-converted image and a preset target style image; and adjusting a model parameter of the initialized target style conversion model according to the loss information to obtain the target style conversion model.

The training image may include a to-be-converted image, for example, a real person self-portrait photograph, and the target style after conversion is an anime style, or the like.

In an embodiment, the process of training the initialized target style conversion model may be a process of continuous learning by using the initialized target style conversion model to implement style conversion processing of the training image. Specifically, the step of "performing style conversion on the training image by using the target style feature and the initialized target style conversion model to obtain a style-converted image" may include:

encoding the training image by using the initialized target style conversion model to obtain a style feature of the training image;

converting the style feature of the training image by using the target style feature to obtain a style-converted feature of the training image conforming to the target style feature; and generating the style-converted image according to the style-converted feature by using the initialized target style conversion model.

In an embodiment, when the initialized target style conversion model is a GAN, the GAN may include a generator network and a discriminator network. A function of the generator network is to generate image content, and a function of the discriminator network is to discriminate the image content generated by the generator network, so that the content generated by the generator network is more vivid and realistic. The core logic of the GAN is that the generator network and the discriminator network play against and with each other.

For example, the generator network may convert a style of an image to obtain a style-converted image. Then, the discriminator network may discriminate the style-converted image. If the style of the style-converted image meets a discriminant condition, the image can pass the discriminator network. If the style of the style-converted image does not meet the discriminant condition, the image cannot be discriminated by the discriminator network. In this case, the generator network generates an image of a more vivid style.

The generator network may include a decoder and an encoder. The decoder and the encoder both may be machine learning networks. For example, the decoder and the encoder both may be CNN networks.

In an embodiment, when the training image is encoded by using the initialized target style conversion model, the encoder may be used to encode the training image to obtain the style feature of the training image.

In an embodiment, when the training image is encoded by using the initialized target style conversion model, the initialized target style conversion model may be used to perform feature extraction on the training image to obtain feature information of the training image. Then, the style feature of the training image is obtained according to the feature information of the training image. Specifically, the step of "encoding the training image by using the initialized target style conversion model to obtain a style feature of the training image" may include:

performing feature extraction on the training image to obtain feature information of the training image;

performing distribution mapping on the feature information to obtain a distribution feature of the feature information; and generating the style feature of the training image according to the distribution feature.

In an embodiment, during feature extraction of the training image, the focus of information extraction is different according to different content of the training image. For example, when the content of the training image is a self-portrait photograph of a face, the focus of the feature extraction of the training image is feature information of the face. For another example, when the content of the training image is a scenic photograph, the focus of the feature extraction of the training image is a global feature of the image. For another example, when the content of the training image is a food photograph, the focus of the feature extraction of the training image is feature information of the food.

In an embodiment, feature extraction may be performed on the training image in a plurality of manners. For example, a convolution operation may be performed on the image by using a gradient operator of the initialized target style conversion model to obtain the feature information of the training image. For another example, a convolution operation may be performed on the image by using a convolution kernel of the initialized target style conversion model to obtain the feature information of the training image, and so on.

In an embodiment, after the feature information of the training image is obtained, distribution mapping processing may be performed on the feature information to obtain a distribution feature of the feature information.

The distribution feature refers to feature information, in a preset distribution law, that corresponds to the feature information of the training image. The preset distribution law may include a preset image distribution law. For example, the preset distribution law may include normal distribution, chi-squared distribution, exponential distribution, Poisson distribution, and the like.

For example, when the preset distribution law is chi-squared distribution, the distribution feature may be a distribution probability value of the feature information of the training image in the chi-squared distribution.

When distribution mapping processing is performed on the feature information, a preset distribution law may be used to perform distribution mapping on the feature information. For example, a distribution law of the normal distribution is shown as follows:

$$f(x) = \frac{1}{\sqrt{2\pi}} e^{\left(-\frac{x^2}{2}\right)} \tag{1}$$

where x may be the feature information of the training image, f(x) may be a distribution feature of the training image, and the distribution feature may be a vector or a matrix.

In an embodiment, the style feature of the training image may be generated according to the distribution feature by using the initialized target style conversion model.

For example, the distribution feature may be converted into the style feature of the training image by using a preset latent vector. The preset latent vector refers to a vector preset in the initialized target style conversion model. The vector can convert the distribution feature into the style feature of the training image.

In an embodiment, after the style feature of the training image is obtained, the target style feature may be used to convert the style feature of the training image to obtain a style-converted feature of the training image.

Feature conversion processing may be performed on the training image in a plurality of manners by using the target style feature.

For example, the target style feature and the style feature of the training image may be added to obtain the style-converted feature of the training image.

For another example, adaptive instance normalization (AdaIN) processing may be performed on the target style feature and the style feature of the training image to obtain the style-converted feature of the training image.

AdaIN is a method that can align an average value and a variance of image features to an average value and a variance of style images, thereby implementing style conversion of an image. For example, AdaIN may align an average value and a variance of style features of the training image to an average value and a variance of target style features to obtain a style-converted feature.

AdaIN may be performed on the target style feature and the style feature of the training image according to the following formula:

$$AdaIN(x, y) = \sigma(y)\left(\frac{x - \mu(x)}{\sigma(x)}\right) + \mu(y) \tag{2}$$

where x represents the style feature of the training image, y represents the target style feature, and $\sigma(\ )$ and $\mu(\ )$ may represent an average value and a standard deviation, respectively. According to the foregoing formula (2), through AdaIN processing, the average value and the variance of the style features of the training image can be aligned to the average value and the variance of the target style features.

In an embodiment, after the style-converted feature is obtained, the style-converted image of the training image may be generated according to the style-converted feature by using the initialized target style conversion model. Specifically, the step of "generating the style-converted image according to the style-converted feature by using the initialized target style conversion model" may include:

decoding the style-converted feature by using the initialized target style conversion model to obtain a decoded image;

performing semantic segmentation processing on the training image to obtain semantic information of the training image; and performing feature enhancement processing on the decoded image by using the semantic information to obtain the style-converted image.

In an embodiment, when the preset target style conversion model is a GAN, the decoder in the generator network may be used to decode the style-converted feature to obtain a decoded image.

The decoded image includes an image already having the target style feature. However, due to different content of different training images, feature enhancement may be performed on the decoded image according to the content of the training image, so that the style-converted image is more vivid.

For example, when the content of the training image is a face self-portrait photograph, feature enhancement may be performed on the face in the decoded image, so that the style-converted image is more vivid. For another example, when the training image is a scenic image, global feature enhancement may be performed on the decoded image, so that the style-converted image is more vivid.

In an embodiment, semantic segmentation processing may be performed on the training image to obtain semantic information of the training image. Then, feature enhancement processing is performed on the decoded image by using the semantic information to obtain the style-converted image.

Semantic segmentation refers to: classifying each piece of information in a scene to identify a particular type of information. For example, when the content of the training image is a face self-portrait photograph, face information and background information can be distinguished through semantic segmentation. In addition, information about five senses of the face can also be distinguished. For example, positions of eyes and a position of a nose of the face can be distinguished.

The semantic information includes information that can illustrate the content of the training image. For example, when the content of the training image is a face self-portrait photograph, a position of a face, a position of a background, and respective positions of five senses in the face in the training image can be known by using the semantic information. For example, the semantic information may be a semantic segmentation mask. The semantic segmentation mask is a digital description of the semantic information, a position of a face in the training image can be known by using the semantic segmentation mask.

In an embodiment, semantic segmentation may be performed on the training image in a plurality of manners. For example, two-dimensional (2D) semantic segmentation or three-dimensional (3D) semantic segmentation may be used. For another example, a machine learning network such as PointNet or PointNet++ may be used to perform semantic segmentation on the training image.

In an embodiment, when feature enhancement processing is performed on the decoded image by using the semantic information, the semantic information and feature information of the decoded image may be superimposed. For example, when the training image is a face self-portrait photograph, and the decoded image is an anime style image of the face self-portrait photograph, face semantic information of the training image may be superimposed into the feature information of the decoded image to enhance a face feature of the decoded image, so that the style-converted image is more vivid and sharply featured.

In an embodiment, after the style-converted image is obtained, loss information between the style-converted image and a preset target style image may be calculated, so that the model parameter of the initialized target style conversion model can be adjusted according to the loss information, to obtain the target style conversion model.

The loss information may be used for evaluating a style similarity between the style-converted image and the preset target style image. For example, a smaller value of the loss information indicates a higher style similarity between the style-converted image and the preset target style image and better model performance. On the contrary, a larger value of the loss information indicates a lower style similarity between the style-converted image and the preset target style image and worse model performance.

In an embodiment, a loss function may be used to calculate the loss information between the style-converted image and the preset target style image. The loss function may include an $L_1$ loss function, an $L_2$ loss function, a 0-1 loss function, a cross-entropy loss function, an exponential loss function, or the like.

In an embodiment, when the preset target style conversion model is a GAN, a discriminator network in the GAN may alternatively be used to calculate the loss information between the style-converted image and the preset target style image.

In an embodiment, after the loss information is obtained, the model parameter of the initialized target style conversion model may be adjusted according to the loss information to obtain the target style conversion model.

For example, when the loss information is relatively large, the model parameter of the initialized target style conversion model may be adjusted. Then, the target style conversion model after the adjustment is trained to check whether the loss information is improved. Training is repeatedly performed in the foregoing manner, until the loss information meets a requirement. In this case, the currently adjusted target style conversion model may be determined as the target style conversion model.

In an embodiment, during training of the preset full style conversion model, because the full style feature includes style features of a plurality of types of images, a training set of the full style conversion model is usually rich and sufficient. Therefore, the preset full style conversion model may be trained by using the full style feature to obtain the full style conversion model. For the process of training the preset full style conversion model by using an image of a basic style, refer to the process of training the initialized target style conversion model, which is not repeated herein.

In this embodiment of this application, a preset full style conversion model is trained, so that a full style conversion model can learn features of a plurality of styles and have a basic capability of performing style conversion on an image. Then, a full style feature is used to perform migration training on a to-be-trained target style conversion model, thereby improving efficiency of training a model.

During the training of the model, semantic information of a training image is used to perform enhancement processing on the image, so that performance of the model can be further improved, thereby making the image whose style is converted by using the model close to a target style and sharply featured.

In an embodiment, to further improve performance of the target style conversion model, the full style conversion model with a relatively strong generalization capability may be further used to adjust the target style conversion model, so that the adjusted target style conversion model has better performance, and an image on which style conversion is performed by the adjusted target style conversion model can be closer to the target style.

Specifically, before the target style conversion model is used to process a to-be-converted model, the image style conversion method further includes: adjusting a model parameter of the target style conversion model based on a model parameter of the full style conversion model to obtain an adjusted target style conversion model, for performing style conversion on the to-be-converted image.

In an embodiment, the step of "adjusting a model parameter of the target style conversion model based on a model parameter of the full style conversion model to obtain an adjusted target style conversion model" may include:

sifting out at least one function layer from the target style conversion model;

sifting out an adjustment reference layer corresponding to the function layer from the full style conversion model; and adjusting a parameter of the function layer based on a parameter of the adjustment reference layer to obtain the adjusted target style conversion model.

In an embodiment, a network structure of a machine learning network may include a plurality of function layers, where each function layer has a specific function. For example, a network structure of a CNN network may include a feature extraction layer, a pooling layer, a fully connected layer, and the like. Each function layer includes a corresponding calculation factor. For example, the feature extraction layer may include a convolution kernel, the pooling layer may include a pooling function, and so on. Therefore, the model parameter may refer to a parameter in the calculation factor in the function layer. For example, the model parameter may refer to a function coefficient of the pooling function in the pooling layer, and so on.

In an embodiment, when the model parameter of the target style conversion model is adjusted based on the model parameter of the full style conversion model, at least one function layer may be first sifted out from the target style conversion model. The function layer refers to a function layer whose performance further needs to be adjusted. For example, when a feature extraction layer in the target style conversion model has relatively poor performance, the feature extraction layer may be determined as a function layer and sifted out. For another example, when both a feature extraction layer and a pooling layer in the target style conversion model have relatively poor performance, both the feature extraction layer and the pooling layer may be extracted as function layers.

In an embodiment, a corresponding adjustment reference layer may be sifted out from the full style conversion model according to the function layer. The adjustment reference layer includes a function layer used for reference during the adjustment of the function layer.

For example, when both a feature extraction layer and a pooling layer in the target style conversion model have relatively poor performance, a feature extraction layer and a pooling layer may be correspondingly sifted out from the full style conversion model, and the feature extraction layer and the pooling layer in the full style conversion model are determined as adjustment reference layers.

In an embodiment, after the function layer and the adjustment reference layer are sifted out, a parameter of the function layer may be adjusted based on a parameter of the adjustment reference layer to obtain the adjusted target style conversion model. When the parameter of the function layer is adjusted by using the parameter of the adjustment reference layer, the parameter of the adjustment reference layer and the parameter of the function layer may be fused to obtain the adjusted target style conversion model. Specifically, the step of "adjusting a parameter of the function layer based on a parameter of the adjustment reference layer to obtain the adjusted target style conversion model" may include:

determining a parameter fusion intensity of the function layer and a parameter fusion intensity of the adjustment reference layer; and performing parameter fusion processing on the parameter of the function layer and the parameter of the adjustment reference layer according to the parameter fusion intensity of the function layer and the parameter fusion intensity of the adjustment reference layer to obtain the adjusted target style conversion model.

For example, the parameter of the function layer is $a_1$, and the parameter of the adjustment reference layer is $b_1$. The parameter fusion intensity of the function layer is $p_1$, and the parameter fusion intensity of the adjustment reference layer is $q_1$. In this case, when parameter fusion processing is performed on the parameter of the function layer and the parameter of the adjustment reference layer, the parameters are respectively multiplied by the parameter fusion intensities and the results of the multiplication are then added. For example, it may be shown as follows:

$$C = a_1 p_1 + b_1 q_1 \tag{3}$$

where C is a parameter obtained after the fusion, used as a new parameter of the target style conversion model. Through parameter fusion, the parameter of the target style conversion model may change, so that the adjusted target style conversion model not only can convert the style of the image into the target style, but also improves, through the full style conversion model, a capability of performing style conversion on the image.

104. Obtain a full style feature and a to-be-converted image, input the full style feature, the target style feature, and the to-be-converted image into the target style conversion model, and perform style conversion on the to-be-converted image to obtain a target image conforming to a target style.

In an embodiment, a full style is a style set including various basic styles. The full style feature, as a feature combination, includes image features of various different basic styles. For example, there are 10 different basic styles. In this case, the full style feature includes 10 different image style features. For example, basic styles include 10 different anime styles, and each anime style corresponds to a style of paining of an animation writer. In this case, the full style feature includes 10 different anime style features.

In an embodiment, before the full style feature is obtained, images of various different styles may be encoded by using a style encoder to obtain features of various different image styles, as the full style feature.

Specifically, a plurality of images may be encoded by using the style encoder to obtain a plurality of image style features. For example, 5000 images may be encoded by using the style encoder. The 5000 images have 20 styles. After the 5000 images are encoded by using the style encoder, 5000 encoding vectors may be obtained. Then, encoding vectors having the same style may be averaged and summed to obtain 20 style features, to be combined into a full style feature.

The style encoder may alternatively be a machine learning network, for example, a CNN network, a DNN network, or a GAN network.

In an embodiment, the target style feature and the full style feature may have various representation forms. For example, the target style feature and the full style feature each may be in a form of a vector or a matrix.

In an embodiment, the to-be-converted image refers to an image on which style conversion needs to be performed. A style and content of the to-be-converted image is not limited in this embodiment of this application. For example, the to-be-converted image may be a self-portrait photograph of a person, a scenic photograph, or an animal photograph.

For example, when the to-be-converted image is a self-portrait photograph of a person, the target style may be an anime style. That is, the image style conversion method provided in this embodiment of this application can convert the self-portrait photograph of the person into a photograph of the anime style.

For another example, when the to-be-converted image is a scenic photograph, the target style may be an oil painting style. That is, the image style conversion method provided in this embodiment of this application can convert the scenic photograph into a photograph of the oil painting style.

In an embodiment, feature fusion may alternatively be performed on the full style feature and the target style feature to obtain a fused image style feature. The full style feature may include a plurality of style features. Therefore, statistical processing may be performed on the plurality of style features, and then fusion is performed with the target style feature.

Specifically, the step of "inputting the full style feature, the target style feature, and the to-be-converted image into the target style conversion model, and performing style conversion on the to-be-converted image to obtain a target image conforming to a target style" may include:

performing feature fusion on the full style feature and the target style feature to obtain a fused image style feature;
  encoding the to-be-converted image by using the target style conversion model to obtain an intermediate style feature of the to-be-converted image;
  converting the intermediate style feature by using the fused image style feature to obtain a converted style feature; and
  decoding the converted style feature by using the target style conversion model to obtain the target image.

The full style feature includes a plurality of basic style features, and the step of "performing feature fusion on the full style feature and the target style feature to obtain a fused image style feature" may include:

performing statistical processing on each basic style feature to obtain a statistical image style feature; and
  fusing the statistical image style feature and the target style feature to obtain the fused image style feature.

Statistical processing may be performed on the full style feature in a plurality of manners. For example, the plurality of image style features may be averaged to obtain the statistical image style feature. For another example, a variance of the plurality of image style features may be calculated to obtain the statistical image style feature.

After the statistical image style feature is obtained, the statistical image style feature and the target style feature may be fused to obtain the fused image style feature. For example, the statistical image style feature and the target style feature may be added to obtain the fused image style feature.

In an embodiment, an order of performing the step of "performing feature fusion on the full style feature and the target style feature to obtain a fused image style feature" and the step of "adjusting a model parameter of the target style conversion model based on a model parameter of the full style conversion model to obtain an adjusted target style conversion model" is not limited. For example, the step of "performing feature fusion on the full style feature and the target style feature to obtain a fused image style feature" may be performed first, or the step of "adjusting a model parameter of the target style conversion model based on a model parameter of the full style conversion model to obtain an adjusted target style conversion model" may be performed first. For another example, the foregoing two steps may be performed in parallel.

In an embodiment, style conversion processing may be performed on the to-be-converted image by using the adjusted target style conversion model and the fused image style feature to obtain the target image conforming to the target style.

In an embodiment, when the adjusted target style conversion model is a GAN, the encoder in the generator network may be used to encode the to-be-converted image to obtain a to-be-converted image style of the to-be-converted image.

In an embodiment, feature extraction may be performed on the to-be-converted image by using the adjusted target style conversion model to obtain feature information of the to-be-converted image. Then, an intermediate style feature is obtained according to the feature information of the to-be-converted image. Specifically, the step of "encoding the to-be-converted image by using the target style conversion model to obtain an intermediate style feature of the to-be-converted image" may include:

extracting feature information from the to-be-converted image;
  performing distribution mapping on the feature information to obtain a distribution feature of the feature information; and
  generating the intermediate style feature according to the distribution feature.

Feature extraction may be performed on the to-be-converted image in a plurality of manners. For example, a convolution operation may be performed on the to-be-converted image by using a gradient operator of the adjusted target style conversion model to obtain the feature information of the to-be-converted image. For another example, a convolution operation may be performed on the to-be-converted image by using a convolution kernel of the adjusted target style conversion model to obtain the feature information of the to-be-converted image, and so on.

When distribution mapping processing is performed on the feature information, a preset distribution law may be used to perform distribution mapping on the feature information.

When the intermediate style feature of the to-be-converted image is generated by using the distribution feature, a preset latent vector may be used to convert the distribution feature into the intermediate style feature.

In an embodiment, the intermediate style feature may be converted by using the fused image style feature in a plurality of manners to obtain the converted style feature.

For example, the fused image style feature and the intermediate style feature may be added to obtain the converted style feature.

For another example, AdaIN processing may be performed on the fused image style feature and the intermediate style feature to obtain the converted style feature.

In an embodiment, when the adjusted target style conversion model is a GAN, the decoder in the generator network may be used to decode the to-be-converted image to obtain the target image conforming to the target style.

In an embodiment, after the target image is obtained, quality of the target image may be further detected, and when the quality of the target image is not satisfactory, the quality of the target image may be enhanced.

Quality information of the target image includes information that can represent image quality. For example, the quality information may include information such as resolution or an image size of the target image.

In an embodiment, quality enhancement processing may be performed on the target image according to the quality information to obtain an adjusted target image. For example, when the resolution of the target image is extremely low, the resolution of the target image can be improved. For another example, when the target image is of poor quality because the image size is extremely small or small, the quality of the image may be improved by adjusting the image size and adding pixel information to the image.

In an embodiment, the target image may be further enhanced by using an image enhancement model. Specifically, the image style conversion method provided in this embodiment of this application may further include:

performing recognition processing on the target image to obtain quality information of the target image; and when the quality information does not meet a preset requirement, performing quality enhancement on the target image by using the image enhancement model to obtain an enhanced target image.

The image enhancement model may be any machine learning model. For example, the image enhancement model may be a CNN model or a DNN model. For another example, a structure of the image enhancement model may include a convolutional (Conv) layer, a batch normalization (BN) layer, and a rectified linear unit (ReLU) function. The Cony layer may include a plurality of convolution kernels, and each convolution kernel may perform sampling on an image to obtain feature information of the image. The BN layer may normalize information output by the Cony layer to obtain normalized information. The ReLU function is a non-linear function and can perform non-linear transformation on information.

In an embodiment, before the target image is enhanced by using the image enhancement model, a preset image enhancement model may be obtained and the preset image enhancement model is trained to obtain the image enhancement model.

Specifically, the step of "obtaining an image enhancement model" may include:

obtaining a high definition reference image and a preset image enhancement model;

performing degradation processing on the high definition reference image to obtain a degraded image; and training the preset image enhancement model by using the high definition reference image and the degraded image to obtain the image enhancement model.

The high definition reference image may include a high-quality image of any style. "High quality" refers to high definition and no noise. The preset image enhancement model may be a model stacked with Conv-BN-ReLU as a network structure.

In an embodiment, there are usually a relatively small quantity of high definition reference images. Therefore, degradation processing may be performed on the high definition reference image to obtain a degraded image. Then, the high definition reference image and the degraded image are used as an image pair to train the preset image enhancement model to obtain the image enhancement model.

Figure 5:
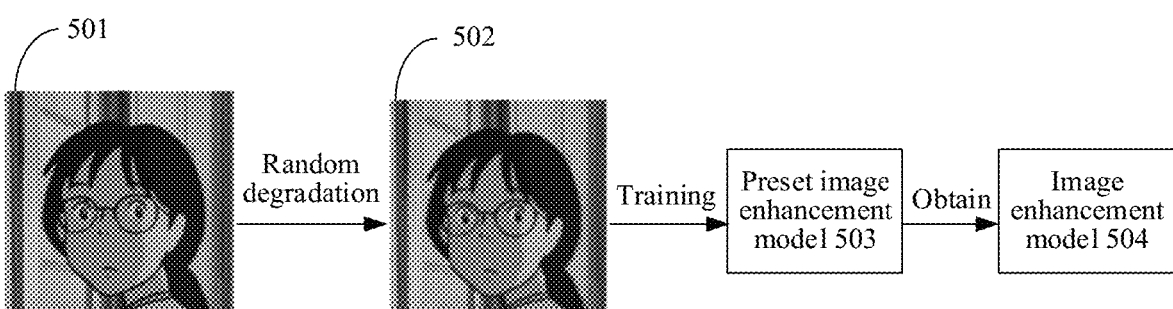
FIG. 5 is a schematic scenario diagram of training an image enhancement model according to an embodiment of this application.

For example, as shown in FIG. 5, a high definition reference image 501 may be randomly degraded to obtain a degraded image 502. Then, a preset image enhancement model 503 may be trained by using the degraded image 502 to obtain an image enhancement model 504.

The degradation processing includes processing to reduce quality of the high definition reference image. The degradation processing may be performed in a plurality of manners. For example, the quality of the high definition reference image may be reduced by adding random noise to the high definition reference image. For another example, the quality of the high definition reference image may be reduced by randomly scaling an image size of the high definition reference image. For another example, the quality of the high definition reference image may be reduced by randomly averaging pixels of the high definition reference image.

Figure 6:
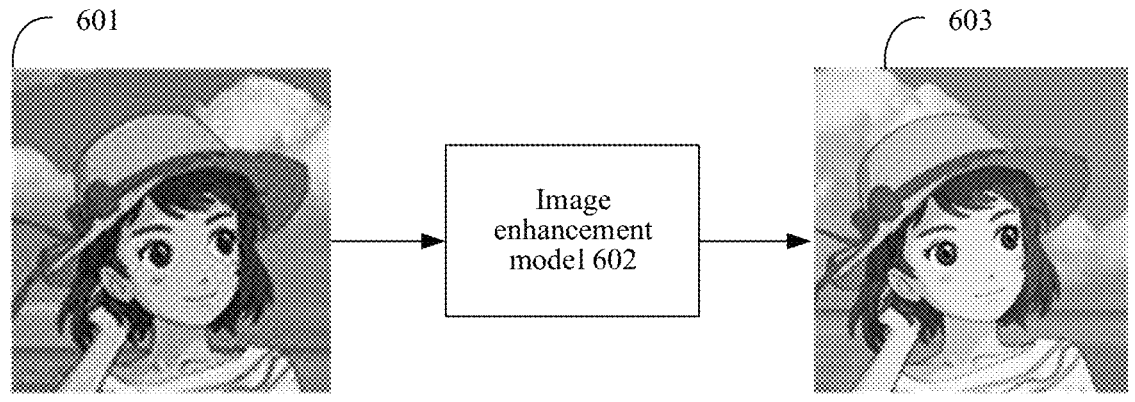
FIG. 6 is a schematic effect diagram of an image enhancement model according to an embodiment of this application.

In an embodiment, after the image enhancement model is obtained, quality enhancement processing may be performed on the target image by using the image enhancement model. For example, as shown in FIG. 6, if a target image 601 has a problem of relatively low resolution, quality enhancement processing may be performed on the target image 601 by using an image enhancement model 602 to obtain an enhanced target image 603.

According to the image style conversion method provided in the foregoing embodiment, the model parameter of the target style conversion model is adjusted by using the model parameter of the full style conversion model, so that the target image generated by the adjusted target style conversion model is closer to the target style, thereby improving accuracy of performing style conversion on an image.

In addition, the fused image style feature is also used during generation of the target image. The fused image style feature is obtained by performing feature fusion on the full style feature and the target style feature. Therefore, the fused image style feature is not only pertinent, but also generalized, so that the accuracy of performing style conversion on an image can be further improved.

In addition, in this embodiment of this application, an image enhancement model is also obtained through training in a self-supervised manner. This model is a generic enhancement model, and can be used not only for pre-optimization of a low-quality image (referring to the foregoing step 101), but also for further quality enhancement of a generated result, thereby improving the quality of the target image. The image enhancement model may be used as an independent generic animation quality enhancement tool and used alone.

Figure 7:
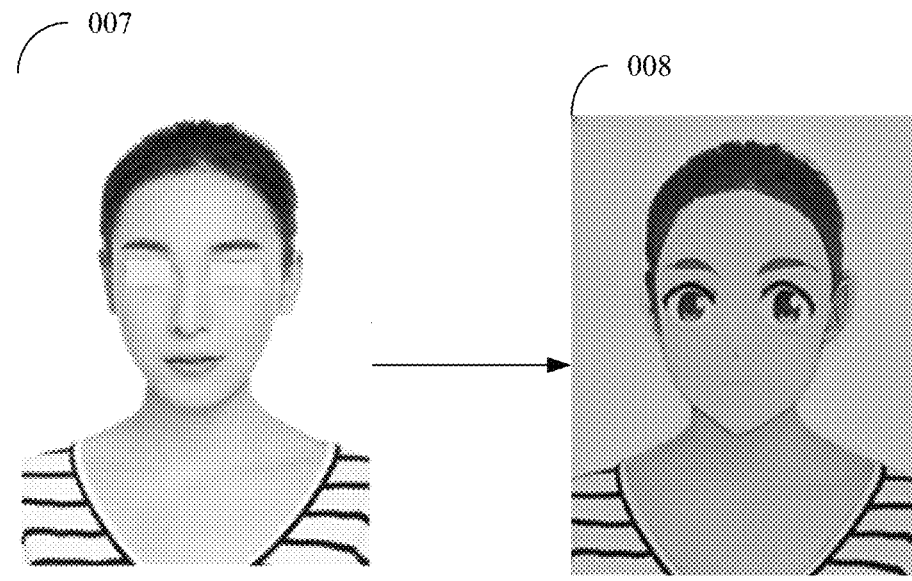
FIG. 7 is a schematic effect diagram of image style conversion according to an embodiment of this application.

In the image style conversion method described in this embodiment of this application, a style of an image can be converted. For example, a physical object image can be converted into an image of a comic style. For example, as shown in FIG. 7, a captured portrait image 007 can be converted into an image 008 of a comic style. Next, in this application scenario, the image style conversion method provided in the embodiments of this application is to be described in further detail. An image style conversion method shown in FIG. 8 is performed by an electronic device, for example, the electronic device 110 in FIG. 1. A specific procedure is as follows:

200. The electronic device obtains a low-quality first target style image, a preset full style conversion model, a preset target style conversion model, a full style feature, and a to-be-converted image.

A target style image refers to a comic image of a particular target style.

Figure 9:
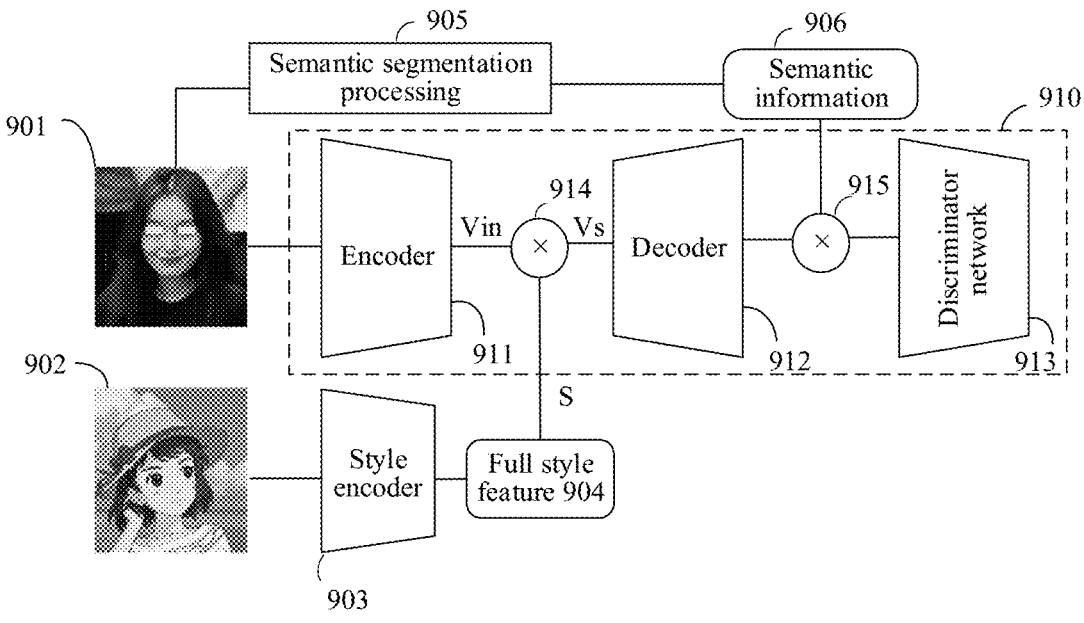
FIG. 9 is another schematic scenario diagram of an image style conversion method according to an embodiment of this application.

The preset full style conversion model may be a GAN model. The preset target style conversion model may also be a GAN model. For example, as shown in FIG. 9, a GAN model 910 may include a generator network (not shown) and a discriminator network 913. The generator network includes an encoder 911 and a decoder 912.

A full style feature 904 may include a sufficient quantity of readily available features of an anime style image 902. In an embodiment, before the full style feature is obtained, images of various different styles may be encoded by using a style encoder to obtain features of various different image styles. For example, as shown in FIG. 9, a plurality of anime style images 902 may be encoded by using a style encoder 903 to obtain the full style feature 904, denoted by S.

The to-be-converted image may include an image on which image style conversion needs to be performed. For example, the to-be-converted image may be a non-comic image.

201. The electronic device performs quality enhancement on the first target style image to obtain a second target style image, and performs feature extraction on the second target style image to obtain a target style feature.

The target style feature includes a feature of a comic image of a particular target style.

202. The electronic device trains the preset full style conversion model by using the full style feature to obtain a full style conversion model.

A process of training the preset full style conversion model may be shown in FIG. 9. The electronic device may first put a training image 901 through the encoder 911 to obtain a style feature of the training image, denoted by Vin.

Then, the electronic device may perform feature conversion processing 914 on the style feature Vin of the training image by using the full style feature S to obtain a style-converted feature of the training image. For example, AdaIN processing may be performed on Vin and S to obtain the style-converted feature of the training image, denoted by $V_S$.

Next, the electronic device may use the decoder 912 to decode $V_S$ to obtain a decoded image of the training image 901.

The electronic device may further perform semantic segmentation processing 905 on the training image 901 to obtain semantic information 906 of the training image 901; and then, perform feature enhancement processing 915 on the decoded image by using the semantic information to obtain a style-converted image.

After obtaining the style-converted image, the electronic device may use the discriminator network 913 to discriminate the style-converted image to calculate loss information between the style-converted image and a preset basic style image.

Then, the electronic device may adjust a model parameter of a generator by using the loss information to improve a style conversion capability of the generator, to obtain a full style conversion model with performance meeting a requirement.

203. The electronic device initializes a model parameter of the preset target style conversion model by using a model parameter of the full style conversion model to obtain an initialized target style conversion model.

204. The electronic device trains the initialized target style conversion model by using the target style feature to obtain a target style conversion model.

205. The electronic device adjusts a model parameter of the target style conversion model based on the model parameter of the full style conversion model to obtain an adjusted target style conversion model.

For example, the electronic device sifts out at least one function layer from the target style conversion model. Then, the electronic device may sift out a corresponding adjustment reference layer from the full style conversion model according to the function layer. Next, the electronic device may adjust a parameter of the function layer by using a parameter of the adjustment reference layer to obtain the adjusted target style conversion model.

206. The electronic device performs feature fusion on the full style feature and the target style feature to obtain a fused image style feature.

For example, the electronic device averages style features corresponding to each style in the full style feature to obtain an averaged style feature. Then, the electronic device adds the averaged style feature and the target style feature to obtain the fused image style feature.

207. The electronic device performs style conversion on the to-be-converted image by using the adjusted target style conversion model and the fused image style feature to obtain a target image conforming to a target style.

Figure 10:
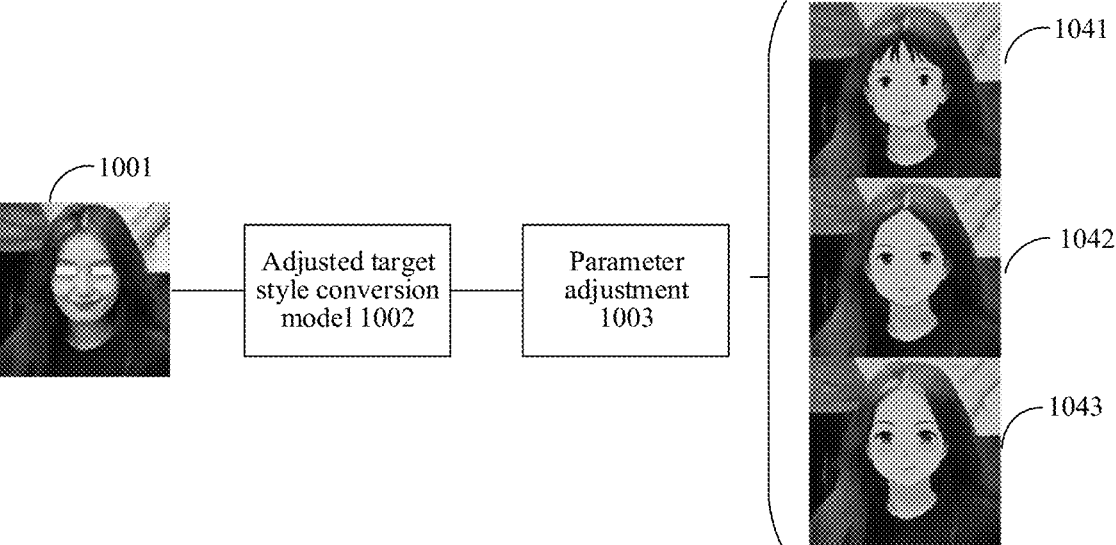
FIG. 10 is another schematic scenario diagram of an image style conversion method according to an embodiment of this application.

For example, as shown in FIG. 10, a non-comic image 1001 may be converted into an image of a comic style by using an adjusted target style conversion model 1002. In addition, parameter adjustment 1003 may be further performed on the adjusted target style conversion model to generate images of different comic styles, including a left-biased-style image 1041, a middle-style image 1042, and a right-biased-style image 1043.

In this embodiment of this application, the electronic device obtains the full style conversion model, the target style conversion model, the full style feature, the target style feature, and the to-be-converted image; adjusts the model parameter of the target style conversion model by using the model parameter of the full style conversion model to obtain the adjusted target style conversion model, so that a training effect for animation is more stable; performs feature fusion on the full style feature and the target style feature to obtain the fused image style feature, so that a more diversified animation synthesis effect can be obtained; and performs style conversion on the to-be-converted image by using the adjusted target style conversion model and the fused image style feature to obtain the target image conforming to the target style. This resolves a current problem that it is difficult to obtain a large quantity of high-quality training pictures of specific styles in an animation generation task, implements learning of high-quality portrait animation generation by using only a limited quantity of low-quality samples, and improves accuracy of performing style conversion on an image.

To better implement the image style conversion method provided in the embodiments of this application, in an embodiment, an image style conversion apparatus is further provided. The image style conversion apparatus may be integrated into an electronic device. Nouns therein have meanings the same as those in the foregoing image style conversion method. For specific implementation details, refer to the description in the method embodiments.

Figures 11, 12:
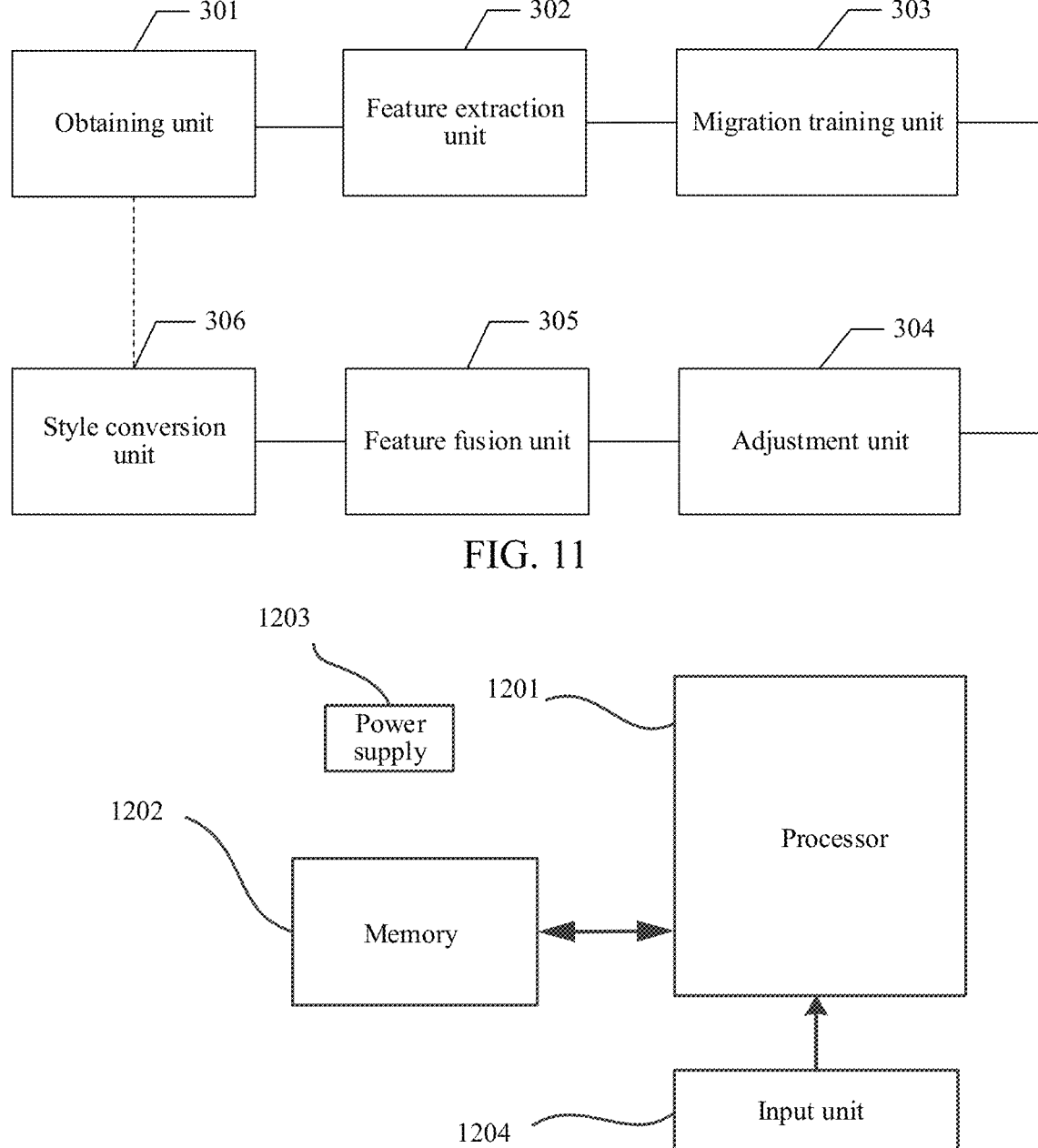
FIG. 11 is a schematic structural diagram of an image style conversion apparatus according to an embodiment of this application.
FIG. 12 is a schematic structural diagram of an electronic device according to an embodiment of this application.

In an embodiment, an image style conversion apparatus is provided. The image style conversion apparatus may be specifically integrated into an electronic device. As shown in FIG. 11, the image style conversion apparatus includes: an obtaining unit 301, a feature extraction unit 302, a migration training unit 303, an adjustment unit 304, a feature fusion unit 305, and a style conversion unit 306. Details are as follows:

The obtaining unit 301 is configured to obtain a first target style image, and perform quality enhancement on the first target style image to obtain a second target style image.

The feature extraction unit 302 is configured to perform feature extraction on the second target style image to obtain a target style feature.

The migration training unit 303 is configured to obtain a full style conversion model, and perform migration training on a preset target style conversion model by using the full style conversion model and the target style feature to obtain a target style conversion model.

The style conversion unit 306 is configured to obtain a full style feature and a to-be-converted image, input the full style feature, the target style feature, and the to-be-converted image into the target style conversion model, and perform style conversion on the to-be-converted image to obtain a target image conforming to a target style.

In an embodiment, the feature fusion unit 305 is configured to perform feature fusion on the full style feature and the target style feature to obtain a fused image style feature.

The style conversion unit 306 may include:

an encoding subunit, configured to encode the to-be-converted image by using the target style conversion model to obtain an intermediate style feature of the to-be-converted image;

a feature conversion subunit, configured to convert the intermediate style feature by using the fused image style feature to obtain a converted style feature; and a decoding subunit, configured to decode the converted style feature by using the target style conversion model to obtain the target image.

In an embodiment, the encoding subunit may include:

a feature extraction module, configured to extract feature information from the to-be-converted image;

a distribution mapping module, configured to perform distribution mapping on the feature information to obtain a distribution feature of the feature information; and a generation module, configured to generate the intermediate style feature according to the distribution feature.

In an embodiment, the full style feature includes a plurality of basic style features, and the feature fusion unit 305 may include:

a statistical subunit, configured to perform statistical processing on each basic style feature to obtain a statistical image style feature; and a fusion subunit, configured to fuse the statistical image style feature and the target style feature to obtain the fused image style feature.

In an embodiment, the adjustment unit 304 is configured to adjust a model parameter of the target style conversion model based on a model parameter of the full style conversion model to obtain an adjusted target style conversion model, for performing style conversion on the to-be-converted image.

In an embodiment, the adjustment unit 304 may include:

a first filtering subunit, configured to sift out at least one function layer from the target style conversion model;

a second filtering subunit, configured to sift out an adjustment reference layer corresponding to the function layer from the full style conversion model; and an adjustment subunit, configured to adjust a parameter of the function layer based on a parameter of the adjustment reference layer to obtain the adjusted target style conversion model.

In an embodiment, the adjustment subunit may include:

a determining module, configured to determine a parameter fusion intensity of the function layer and a parameter fusion intensity of the adjustment reference layer; and a parameter fusion module, configured to fuse the parameter of the function layer and the parameter of the adjustment reference layer according to the parameter fusion intensity of the function layer and the parameter fusion intensity of the adjustment reference layer to obtain the adjusted target style conversion model.

In an embodiment, the migration training unit 303 may include:

an initialization subunit, configured to initialize a model parameter of the preset target style conversion model by using a model parameter of the full style conversion model to obtain an initialized target style conversion model; and a training subunit, configured to train the initialized target style conversion model by using the target style feature to obtain the target style conversion model.

In an embodiment, the training subunit may include:

an obtaining module, configured to obtain a training image;

a style conversion module, configured to perform style conversion on the training image by using the target style feature and the initialized target style conversion model to obtain a style-converted image;

a calculation module, configured to calculate loss information between the style-converted image and a preset target style image; and an adjustment module, configured to adjust a model parameter of the initialized target style conversion model according to the loss information to obtain the target style conversion model.

In an embodiment, the style conversion module may include:

an encoding submodule, configured to encode the training image by using the initialized target style conversion model to obtain a style feature of the training image;

a feature conversion submodule, configured to convert the style feature of the training image by using the target style feature to obtain a style-converted feature of the training image conforming to the target style feature; and a generation submodule, configured to generate the style-converted image according to the style-converted feature by using the initialized target style conversion model.

In an embodiment, the generation submodule may be configured to:

decode the style-converted feature by using the initialized target style conversion model to obtain a decoded image;

perform semantic segmentation processing on the training image to obtain semantic information of the training image; and perform feature enhancement processing on the decoded image by using the semantic information to obtain the style-converted image.

In an embodiment, the obtaining unit 301 is further configured to obtain an image enhancement model; and the feature extraction unit 302 is configured to perform quality enhancement on the first target style image by using the image enhancement model.

In an embodiment, the obtaining unit 301 is further configured to perform recognition processing on the target image to obtain quality information of the target image; and when the quality information does not meet a preset requirement, perform quality enhancement on the target image by using the image enhancement model to obtain an enhanced target image.

In an embodiment, the obtaining unit 301 is further configured to obtain a high definition reference image and a preset image enhancement model; perform degradation processing on the high definition reference image to obtain a degraded image; and train the preset image enhancement model by using the high definition reference image and the degraded image to obtain the image enhancement model.

During specific implementation, the foregoing units may be implemented as independent entities, or may be combined arbitrarily and implemented as the same entity or a plurality of entities. For specific implementation of the foregoing units, refer to the foregoing method embodiments. Details are not described herein again.

An embodiment of this application further provides an electronic device. The electronic device may include a terminal or a server. For example, the electronic device may serve as an image style conversion terminal, and the terminal may be a mobile phone, a tablet computer, or the like. For another example, the electronic device may be a server, such as an image style conversion server. FIG. 12 is a schematic structural diagram of a terminal involved in this embodiment of this application. Specifically, the electronic device may include components such as a processor 1201 with one or more processing cores, a memory 1202 with one or more computer-readable storage mediums, a power supply 1203, and an input unit 1204. A person skilled in the art may understand that the electronic device structure shown in FIG. 12 does not constitute a limitation to the electronic device. The electronic device may include more or fewer components than those shown in the figure, or some components may be combined, or a different component arrangement may be used.

The processor 1201 is a control center of the electronic device, and various parts of the entire electronic device are connected through various interfaces and lines. By running or executing a software program and/or module stored in the memory 1202, and invoking data stored in the memory 1202, the processor 1201 performs various functions and data processing of the electronic device, thereby performing overall monitoring on the electronic device. In some embodiments, the processor 1201 may include one or more processing cores. Preferably, the processor 1201 may integrate an application processor and a modem. The application processor mainly processes an operating system, a user interface, an application, and the like. The modem mainly processes wireless communication. It may be understood that, the modem processor may alternatively not be integrated in the processor 1201.

The memory 1202 may be configured to store the software program and module. The processor 1201 runs the software program and module stored in the memory 1202, to execute various functional applications and data processing. The memory 1202 may mainly include a program storage area and a data storage area. The program storage area may store an operating system, an application required by at least one function (for example, a sound playing function and an image playing function), or the like. The data storage area may store data created according to use of the electronic device. In addition, the memory 1202 may include a high-speed random access memory, and may further include a non-volatile memory, such as at least one magnetic disk storage device, a flash memory, or another volatile solid-state storage device. Correspondingly, the memory 1202 may further include a memory controller, to provide access of the processor 1201 to the memory 1202.

The electronic device further includes the power supply 1203 supplying power to the components. Preferably, The power supply 1203 may be logically connected to the processor 1201 by using a power management system, to implement functions such as charging, discharging, and power consumption management by using the power management system. The power supply 1203 may further include one or more of a direct current or alternating current power supply, a re-charging system, a power failure detection circuit, a power supply converter or inverter, a power supply state indicator, and any other component.

The electronic device may further include the input unit 1204. The input unit 1204 may be configured to receive entered numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 1201 in the electronic device may load, according to the following instructions, executable files corresponding to processes of one or more applications into the memory 1202, and the processor 1201 runs the applications stored in the memory 1202 to implement various functions.

For specific implementations of the foregoing operations, refer to the foregoing embodiments. Details are not described herein again.

According to one aspect of this application. a computer program product or a computer program is provided, the computer program product or the computer program including a computer instruction, and the computer instruction being stored in a computer-readable storage medium. A processor of an electronic device reads the computer instruction from the computer-readable storage medium and executes the computer instruction to cause the electronic device to perform the image style conversion method described in the foregoing embodiment.

A person of ordinary skill in the art may understand that, all or some steps of the methods in the foregoing embodiments may be implemented by using a computer program, or implemented through a computer program controlling relevant hardware. The computer program may be stored in a non-transitory computer-readable storage medium and loaded and executed by a processor.

To this end, an embodiment of this application further provides a non-transitory computer-readable storage medium, storing a computer program. The computer program can be loaded by a processor to perform the steps in any one of the image style conversion methods provided in the embodiments of this application. For example, the computer program may perform the image style conversion method described in the foregoing embodiment. Details are not described herein again.

Because the computer program stored in the storage medium may perform the steps in any one of the image style conversion methods provided in the embodiments of this application, the computer program can implement beneficial effects that can be implemented by any one of the image style conversion methods provided in the embodiments of this application. For details, refer to the foregoing embodiments. Details are not described herein again.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The image style conversion method and apparatus, the electronic device, and the storage medium provided in the embodiments of this application are described in detail above. The principle and implementations of this application are described herein by using specific examples. The descriptions of the foregoing embodiments are merely used for helping understand the method and core ideas of this application. Meanwhile, a person skilled in the art may make modifications to the specific implementations and application scopes according to the ideas of this application. In conclusion, the content of this specification are not to be construed as a limitation to this application.

What is claimed is:

1. An image style conversion method, performed by an electronic device, the method comprising:
   performing quality enhancement on a first target style image to obtain a second target style image;
   performing feature extraction on the second target style image to obtain a target style feature;
   performing transfer training on a preset target style conversion model by using a full style conversion model, the first target style image and the target style feature to obtain a target style conversion model, wherein a model architecture of the full style conversion model is the same as a model architecture of the preset target style conversion model;
   encoding a to-be-converted image by using the target style conversion model to obtain an intermediate style feature of the to-be-converted image, further including:
   extracting feature information from the to-be-converted image;
   performing distribution mapping on the feature information to obtain a distribution feature of the feature information; and
   generating the intermediate style feature according to the distribution feature;
   converting the intermediate style feature by using the target image style feature to obtain a converted style feature; and
   decoding the converted style feature by using the target style conversion model to obtain the target image.

2. The method according to claim 1, wherein the converting the intermediate style feature by using the target image style feature to obtain a converted style feature comprises:
   performing feature fusion on a full style feature and the target style feature to obtain a fused image style feature; and
   converting the intermediate style feature by using the fused image style feature to obtain the converted style feature.

3. The method according to claim 2, wherein the full style feature comprises a plurality of basic style features, and the performing feature fusion on the full style feature and the target style feature to obtain a fused image style feature comprises:
   performing statistical processing on each basic style feature to obtain a statistical image style feature; and
   fusing the statistical image style feature and the target style feature to obtain the fused image style feature.

4. The method according to claim 1, wherein the method further comprises:
   adjusting the target style conversion model based on the full style conversion model to obtain an adjusted target style conversion model.

5. The method according to claim 1, wherein the performing transfer training on a preset target style conversion model by using a full style conversion model and the target style feature to obtain a target style conversion model comprises:
   initializing the preset target style conversion model by using the full style conversion model to obtain an initialized target style conversion model; and
   training the initialized target style conversion model by using the target style feature to obtain the target style conversion model.

6. The method according to claim 5, wherein the training the initialized target style conversion model by using the target style feature to obtain the target style conversion model comprises:
   obtaining a training image;
   performing style conversion on the training image by using the target style feature and the initialized target style conversion model to obtain a style-converted image;
   calculating loss information between the style-converted image and a preset target style image corresponding to the training image; and
   adjusting the initialized target style conversion model according to the loss information to obtain the target style conversion model.

7. An electronic device, comprising a memory and a processor, the memory storing a plurality of instructions that, when executed by the processor, cause the electronic device to perform an image style conversion method including:
   performing quality enhancement on a first target style image to obtain a second target style image;
   performing feature extraction on the second target style image to obtain a target style feature;
   performing transfer training on a preset target style conversion model by using a full style conversion model, the first target style image and the target style feature to obtain a target style conversion model, wherein a model architecture of the full style conversion model is the same as a model architecture of the preset target style conversion model;

encoding a to-be-converted image by using the target style conversion model to obtain an intermediate style feature of the to-be-converted image, further including:

extracting feature information from the to-be-converted image;

performing distribution mapping on the feature information to obtain a distribution feature of the feature information; and generating the intermediate style feature according to the distribution feature;

converting the intermediate style feature by using the target image style feature to obtain a converted style feature; and decoding the converted style feature by using the target style conversion model to obtain the target image.

8. The electronic device according to claim 7, wherein the converting the intermediate style feature by using the target image style feature to obtain a converted style feature comprises:

performing feature fusion on a full style feature and the target style feature to obtain a fused image style feature; and converting the intermediate style feature by using the fused image style feature to obtain the converted style feature.

9. The electronic device according to claim 8, wherein the full style feature comprises a plurality of basic style features, and the performing feature fusion on the full style feature and the target style feature to obtain a fused image style feature comprises:

performing statistical processing on each basic style feature to obtain a statistical image style feature; and fusing the statistical image style feature and the target style feature to obtain the fused image style feature.

10. The electronic device according to claim 7, wherein the method further comprises:

adjusting the target style conversion model based on the full style conversion model to obtain an adjusted target style conversion model.

11. The electronic device according to claim 7, wherein the performing transfer training on a preset target style conversion model by using a full style conversion model and the target style feature to obtain a target style conversion model comprises:

initializing the preset target style conversion model by using the full style conversion model to obtain an initialized target style conversion model; and training the initialized target style conversion model by using the target style feature to obtain the target style conversion model.

12. The electronic device according to claim 11, wherein the training the initialized target style conversion model by using the target style feature to obtain the target style conversion model comprises:

obtaining a training image;

performing style conversion on the training image by using the target style feature and the initialized target style conversion model to obtain a style-converted image;

calculating loss information between the style-converted image and a preset target style image corresponding to the training image; and adjusting the initialized target style conversion model according to the loss information to obtain the target style conversion model.

13. A non-transitory computer-readable storage medium, storing a plurality of instructions that, when executed by a processor of an electronic device, cause the electronic device to perform an image style conversion method including:

performing quality enhancement on a first target style image to obtain a second target style image;

performing feature extraction on the second target style image to obtain a target style feature;

performing transfer training on a preset target style conversion model by using a full style conversion model, the first target style image and the target style feature to obtain a target style conversion model, wherein a model architecture of the full style conversion model is the same as a model architecture of the preset target style conversion model;

encoding a to-be-converted image by using the target style conversion model to obtain an intermediate style feature of the to-be-converted image, further including:

extracting feature information from the to-be-converted image;

performing distribution mapping on the feature information to obtain a distribution feature of the feature information; and generating the intermediate style feature according to the distribution feature;

converting the intermediate style feature by using the target image style feature to obtain a converted style feature; and decoding the converted style feature by using the target style conversion model to obtain the target image.

14. The non-transitory computer-readable storage medium according to claim 13, wherein the converting the intermediate style feature by using the target image style feature to obtain a converted style feature comprises:

performing feature fusion on a full style feature and the target style feature to obtain a fused image style feature; and converting the intermediate style feature by using the fused image style feature to obtain the converted style feature.

15. The non-transitory computer-readable storage medium according to claim 14, wherein the full style feature comprises a plurality of basic style features, and the performing feature fusion on the full style feature and the target style feature to obtain a fused image style feature comprises:

performing statistical processing on each basic style feature to obtain a statistical image style feature; and fusing the statistical image style feature and the target style feature to obtain the fused image style feature.

16. The non-transitory computer-readable storage medium according to claim 13, wherein the method further comprises:

adjusting the target style conversion model based on the full style conversion model to obtain an adjusted target style conversion model.

17. The non-transitory computer-readable storage medium according to claim 13, wherein the performing transfer training on a preset target style conversion model by using a full style conversion model and the target style feature to obtain a target style conversion model comprises:

initializing the preset target style conversion model by using the full style conversion model to obtain an initialized target style conversion model; and training the initialized target style conversion model by using the target style feature to obtain the target style conversion model.

* * * * *